United States Patent Office 3,558,658
Patented Jan. 26, 1971

3,558,658
2H,5H-PYRANO(3,2-c)(1)BENZO-PYRAN-4(3H),5-DIONES
John S. McIntyre, Sarnia, Ontario, Canada, assignor to The Dow Chemical Company, Midland, Mich., a corporation of Delaware
No Drawing. Filed Mar. 3, 1967, Ser. No. 620,221
Int. Cl. A01n 9/28; C07d 21/00
U.S. Cl. 260—343.2
6 Claims

ABSTRACT OF THE DISCLOSURE

The present invention is concerned with the condensation of an aldehyde of the formula:

with a pyrone or coumarin compound of the formula:

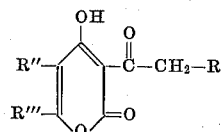

to obtain novel products of the following formula:

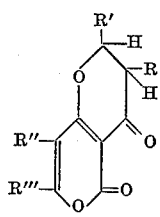

in the above and succeeding formulae in the present specification and claims, R represents alkyl of from 1 to 10, both inclusive, carbon atoms or a phenyl radical of the formula:

wherein Z represents methyl, bromo, chloro, or hydroxy and $n$ represents an integer from 0 to 1, both inclusive; R' represents phenyl, substituted phenyl, naphthyl, 9-anthryl, 9-phenanthryl, styryl, 2-furyl, 2-thienyl, or 1-methyl-2-pyrrolyl; and R" represents hydrogen and R'" represents hydrogen, methyl, or phenyl, or R" and R'", taken together, jointly represent a four-carbon-atom divalent radical which with the two carbon atoms upon which R" and R'" are substituents constitutes a six-carbon-atom unsaturated ring.

The products of the present invention are useful as parasiticides, particularly as agents to control the growth of fungi and bacteria, especially plant pathogenic species such as apple scab and rice blast; the products are also useful as agents to control acarids and insects.

BACKGROUND OF THE INVENTION

It is known that 3-acetyl-4-hydroxy-6-methyl-2-pyrone reacts with benzaldehyde to yield 3-cinnamoyl-4-hydroxy-6-methyl-2-pyrone:

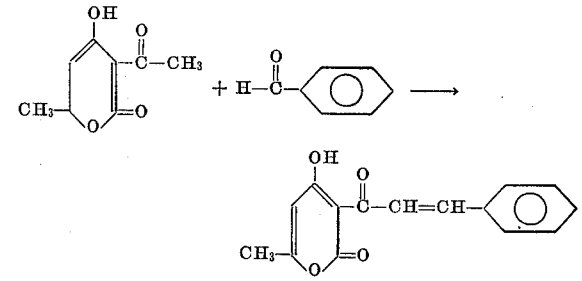

(Journal of the American Chemical Society, vol. 77, pg. 5102, 1955). A similar course of reaction is observed for the corresponding 3-acetyl-4-hydroxycoumarin.

SUMMARY OF THE INVENTION

It has now been found that when the pyrone or coumarin with which the benzaldehyde is reacted bears a 3-acyl group which is propionyl or phenylacetyl, rather than acetyl, the reaction follows an entirely different course which is described by the following reaction scheme:

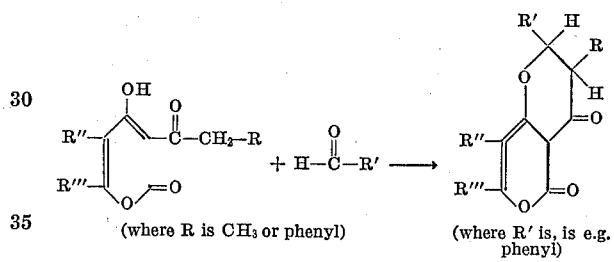

(where R is $CH_3$ or phenyl)   (where R' is, is e.g. phenyl)

Furthermore, this novel reaction is applicable to aldehydes other than benzaldehyde, and to other acyl groups. The reaction goes forward readily, consuming the aldehyde and pyrone or coumarin in equimolecular amounts. The reaction is conveniently carried out in an inert liquid reaction medium; heat may be supplied to the reaction mixture to facilitate the reaction.

As noted foregoing, the novel products obtained from the present aldehyde condensation reaction are useful as parasiticides.

DESCRIPTION OF THE PREFERRED EMBODIMENTS

The novel aldehyde condensation reaction of the present invention is carried out by causing a reaction between an aldehyde of the formula:

with a pyrone or coumarin compound of the formula:

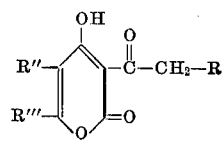

The reaction results in the preparation of novel products of the formula:

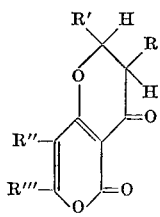

In the above and succeeding formulae, R represents alkyl of from 1 to 10, both inclusive, carbon atoms or a phenyl radical of the formula:

wherein Z represents methyl, bromo, chloro, or hydroxy and $n$ represents an integer of from 0 to 1, both inclusive; R' represents phenyl, substituted phenyl, naphthyl, 9-anthryl, 9-phenanthryl, styryl, 2-furyl, 2-thienyl, or 1-methyl-2-pyrrolyl; and R" represents hydrogen and R''' represents hydrogen, methyl, or phenyl, or R" and R''', taken together, jointly represent a four-carbon-atom divalent radical which with the two carbon atoms upon which R" and R''' are substituents constitutes a six-carbon-atom unsaturated ring.

In the present specification and claims, the term "substituted phenyl" is employed to designate p-acetamidophenyl, p - (dimethylamino)phenyl, p - (diethylamino) phenyl, and phenyl substituted with from 1 to 2 substituents, each of which is independently selected from the group consisting of chloro, bromo, hydroxy, methoxy, or, both substituents taken together, a divalent methylenedioxy substituent.

The reaction of aldehyde and pyrone or coumarin is conveniently carried out in an inert liquid reaction medium. As such reaction media, organic liquids are typically employed; the halogenated hydrocarbons constitute a class of organic liquids preferred for this purpose. The reaction goes forward under temperatures of a wide range, such as from 30° to 200° C. More preferably, however, the reaction is conducted at temperatures of from 50° to 125° C.

The amounts of the reactants employed are not critical, some of the desired product being obtained when employing the reactants in any amounts. However, the reaction consumes the reactants in amounts representing equimolecular amounts, and the supplying of the reactants in such amounts is most economical of the starting materials.

In carrying out the reaction, the reactants are contacted with one another, typically in a reaction medium, as discussed above. The reaction proceeds readily, with the production of the desired product. The reaction mixture is frequently permitted to stand for a period of time following completion of the contacting of the reactants to assure completion of the reaction. Following any such standing period, the reaction mixture is processed to separate the product. Most typically, the reaction medium is removed by evaporation under subatmospheric pressure to separate the product. However, other methods of separation and purification can be used if desired.

The addition to the reaction mixture of a small amount of piperidine facilitates the reaction.

The following examples illustrate the best mode now known for the practice of the present invention and will enable those skilled in the art to practice the same.

EXAMPLE 1

2,3-diphenyl-2H,5H-pyrano(3,2-c)(1)benzopyran-4(3H), 5-dione

4 - hydroxy - 3 - (phenylacetyl)coumarin (15.0 grams; 0.54 mole), benzaldehyde (5.4 milliliters; 0.054 mole), and 20 milliliters of chloroform containing 0.1 milliliter of piperidine were mixed with another and the resulting mixture refluxed overnight. The chloroform was then removed by evaporation and the resulting product residue boiled with pyridine and filtered hot to separate the desired 2,3-diphenyl-2H,5H-pyrano(3,2-c)(1)benzopyran-4 (3H),5-dione product, melting at 247–9° C.

EXAMPLE 2

2-phenyl-3,7-dimethyl-2H,5H-pyrano(4,3-b)-pyran-4(3H),5-dione

4 - hydroxy-6-methyl-3-propionyl-2-pyrone (3.5 grams; 0.017 mole) and benzaldehyde (1.7 milliliters; 0.017 mole) were refluxed overnight in 15 milliliters of chloroform containing a trace of piperidine. The product residue was separated by evaporation of solvent and thereafter recrystallized from a large volume of methanol, yielding the desired 2-phenyl-3,7-dimethyl-2H,5H-pyrano-(4,3-b) pyran-4(3H),5-dione product melting at 244–6° C. Elemental analysis was carried out.

Calc. for $C_{16}H_{14}O_4$ (percent): C, 71.10; H, 5.19. Found (percent): C, 71.15; H, 5.07.

Other representative products of the present invention include those identified in the following examples, in which the symbol "M.W." is used as an abbreviation for the term "molecular weight," and the symbol "M.P." is used as an abbreviation for the term "melting point." The products are prepared in accordance with the procedures of the foregoing examples.

EXAMPLES 3–28

From 4 - hydroxy - 3-propionylcoumarin and 3-chlorobenzaldehyde, 2 - (3 - chlorophenyl)-3-methyl-2H,5H-pyrano(3,2-c)(1)benzopyran-4(3H),5-dione, M.W. of 340.8.

From 4-hydroxy-3-phenylacetyl-6-methyl-2-pyrone and 2-hydroxybenzaldehyde, 2-(2-hydroxyphenyl)-3-phenyl-7-methyl - 2H,5H-pyrano(4,3-b)pyran-4(3H),5-dione product, M.W. of 348.4.

From 4 - hydroxy - 3-propionylcoumarin and 2-naphthaldehyde, 2-(2-naphthyl)-3-methyl-2H,5H-pyrano(3,2-c) (1)benzopyran-4(3H),5-dione product, M.W. of 356.4.

From 4 - hydroxy - 3 - propionyl-6-methyl-2-pyrone and cinnamaldehyde, 2 - styryl-3,7-dimethyl-2H,5H-pyrano(4, 3-b)pyran-4(3H),5-dione product, M.W. of 296.3.

From 4 - hydroxy - 3-phenylacetylcoumarin and 2,4-dichlorobenzaldehyde, 2-(2,4-dichlorophenyl)-3-phenyl-2H, 5H-pyrano(3,2-c)(1)benzopyran-4(3H),5-dione product, M.W. of 437.3.

From 4-hydroxy-3-phenylacetyl-6-methyl-2-pyrone and 3,4-dimethoxybenzaldehyde, 2-(3,4-dimethoxyphenyl)-3-phenyl - 7 - methyl - 2H,5H-pyrano(4,3-b)pyran-4(3H),5-dione product, M.W. of 392.4.

From 4-hydroxy-3-propionylcoumarin and 3,4-methylenedioxybenzaldehyde, 2 - (3,4-methylenedioxyphenyl)-3-methyl - 2H,5H - pyrano(3,2-c)(1)benzopyran-4(3H),5-dione product, M.W. of 350.3.

From 4-hydroxy-3-propionyl-6-methyl-2-pyrone and 2-thiophenealdehyde, 2-thienyl-3,7-dimethyl-2H,5H-pyrano (4,3-b)pyran-4(3H),5-dione product, M.W. of 276.3.

From 4 - hydroxy - 3-phenylacetylcoumarin and p-acetamidobenzaldehyde, 2-(p-acetamidophenyl)-3-phenyl-2H, 5H-pyrano(3,2-c)(1)benzopyran-4(3H),5-dione product, M.W. of 425.4.

From 4-hydroxy-3-propionyl-6-methyl-2-pyrone and p-(diethylamino)benzaldehyde, 2-(p-(diethylamino)-phenyl) - 3,7 - dimethyl-2H,5H-pyrano(4,3-b)pyran-4(3H),5-dione product, M.W. of 341.4.

From 4 - hydroxy - 3-propionylcoumarin and 2-furaldehyde, 2-(2-furyl)-3-methyl-2H,5H-pyrano(3,2-c)-(1)benzopyran-4(3H),5-dione produce, M.W. of 296.3.

From 4-hydroxy-3-phenylacetyl-6-methyl-2-pyrone and 9-anthraldehyde, 2-(9-anthryl)-3-phenyl-7-methyl-2H,5H-pyrano(4,3-b)pyran-4(3H),5-dione product, M.W. of 432.5.

From 4-hydroxy-3-propionylcoumarin and 9-phenanthraldehyde, 2-(9-phenanthryl)-3-methyl-2H,5H-pyrano(3,2-c)(1)benzopyran-4(3H),5-dione product, M.W. of 406.4.

From 4-hydroxy-3-propionyl-6-methyl-2-pyrone and 1-methylpyrrole-2-aldehyde, 2-(1-methyl-2-pyrrolyl)-3,7-dimethyl-2H,5H-pyrano(4,3-b)pyran-4(3H),5-dione product, M.W. of 273.3.

From 4-hydroxy-3-propionylcoumarin and benzaldehyde, 2-phenyl-3-methyl-2H,5H-pyrano(3,2-c)(1)benzopyran-4(3H),5-dione product, M.P. of 190–1° C.

From 4-hydroxy-3-propionyl-2-pyrone and benzaldehyde, 2-phenyl-3-methyl-2H,5H-pyrano(4,3-b)pyran-4(3H),5-dione product, M.W. of 256.3.

From 4-hydroxy-3-octanoyl-6-phenyl-2-pyrone and benzaledphyde, 2,7-diphenyl-3-n-hexyl-2H,5H-pyrano-(4,3-b)pyran-4(3H),5-dione product, M.W. of 402.5.

From 4-hydroxy-3-hexanoyl-2-pyrone and p-bromobenzaldehyde, 2-(p-bromophenyl)-3-n-butyl-2H,5H-pyrano-(4,3-b)pyran-4(3H),5-dione product, M.W. of 377.3.

From 4-hydroxy-decanoyl-6-phenyl-2-pyrone and benzaldehyde, 2,7-diphenyl-3-octyl-2H,5H-pyrano(4,3-b)-pyran-4(3H),5-dione product, M.W. of 430.6.

From 4-hydroxy-3-butyryl-6-methyl-2-pyrone and benzaldehyde, 2-phenyl-3-ethyl-7-methyl-2H,5H-pyrano-(4,3-b)pyran-4(3H),5-dione product, M.W. of 284.3.

From 4-hydroxy-3-(p-tolylacetyl)coumarin and benzaldehyde, 2-phenyl-3-p-tolyl-2H,5H-pyrano(3,2-c)(1)-benzopyran-4(3H),5-dione product, M.W. of 382.4.

From 4-hydroxy-3-phenylacetyl-2-pyrone and benzaldehyde, 2,3-diphenyl-2H,5H-pyrano(4,3-d)pyran-4-(3H),5-dione product, M.W. 318.3.

From 4-hydroxy-3-((o-chlorophenyl)acetyl)-6-methyl-2-pyrone and 2-naphthaldehyde, 2-naphthyl-3-(o-chlorophenyl)-7-methyl-2H,5H-pyrano-(4,3-b)pyran-4(3H),5-dione product, M.W. of 416.9.

From 4-hydroxy-3-((p-bromophenyl)acetyl)-6-phenyl-2-pyrone and 2-furaldehyde, 2-furyl-3-(p-bromophenyl)-7-phenyl-2H,5H-pyrano(4,3-b)-pyran-4(3H),5-dione product, M.W. of 463.3.

From 4-hydroxy-3-((p-hydroxyphenyl)acetyl)-coumarin and 2-thiophenealdhyde, 2-thienyl-3-(p-hydroxyphenyl)-2H,5H-pyrano(3,2-c)(1)benzopyran-4(3H),5-dione product, M.W. of 390.4.

From 4-hydroxy-3-phenylacetyl-6-methyl-2-pyrone and benzaldehyde, 2,3-diphenyl-7-methyl-2H,5H-pyrano(4,3-b)pyran-4(3H),5-dione product, M.P. of 241–3° C.

When one of the products of the present invention is employed as a parasiticide, the unmodified product can be utilized. However, the present invention also encompasses the utilization of the product together with a parasiticide adjuvant. In such utilization, the product can be dispersed on a finely divided solid and the resulting preparation employed as a dust. Also, a product of the present invention, or a composition comprising a product of the present invention and a finely divided solid, can be dispersed in water with the aid of a wetting agent and the resulting aqueous suspension employed as a spray. In other procedures, a product according to the present invention can be employed as the constituent of organic liquid compositions, oil-in-water or water-in-oil emulsions, or water dispersions, with or without the addition of a wetting, dispersing or emulsifying agent.

In representative operations, a treating composition containing, as sole active agent, 500 milligrams of 2,3-diphenyl-2H,5H-pyrano(3,2-c)(1)benzopyran-4(3H),5-dione per 100 milliliters of solvent was employed to treat nymphs of the lone star tick (*Amblyomma americanum*). Treatment was effected by wetting the nymphs briefly with the treating composition. As a result, there was obtained a 100 percent kill and control of lone star tick.

The starting materials to be employed in the condensation reaction of the present invention are themselves prepared in known methods which comprise the acylation of the corresponding 4-hydroxy compound:

and, either concomitantly or subsequently, its rearrangement to the desired starting material. Thus, the 4-hydroxy compound is reacted with the desired acyl halide, of the formula the resulting 4-acyl product is then rearranged to the desired starting material by contacting it with sulfuric acid or pyridine catalyst. Alternately, the acylation is carried out in the presence of the catalyst, in which instance, the desired starting material is obtained directly. Good results are obtained when employing equimolecular proportions of 4-hydroxy compound and acyl halide, or an excess of the acyl halide; and when employing the catalyst in a minor, catalytic amount. The reactions are preferably carried out at temperatures of from 75° to 150° C. and in an organic liquid solvent.

I claim:
1. Compound of the formula:

wherein R represents alkyl of 1 to 10 carbon atoms, inclusive, or a phenyl radical of the formula:

wherein Z represents methyl, bromo, chloro, or hydroxy and $n$ represents an integer of 0 or 1; and R' represents naphthyl, 9-anthryl, 9-phenanthryl, styryl, 2-furyl, 2-thienyl, 1-methyl-2-pyrrolyl or a phenyl radical of the formula:

2. Compound of claim 1 wherein R is methyl.
3. Compound of claim 1 wherein R is phenyl.
4. The compound of claim 1 which is 2,3-diphenyl-2H,5H-pyrano(3,2-c)(1)benzopyran-4(3H),5-dione.
5. The compound of claim 1 which is 2-phenyl-3-methyl-2H,5H-pyrano(3,2-c)(1)benzopyran-4(3H),5-dione.

6. Method for the preparation of a compound of the formula:

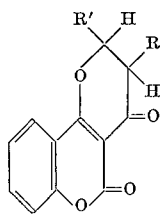

wherein R represents alkyl 1 to 10 carbon atoms, inclusive, or a phenyl radical of the formula:

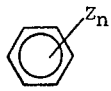

wherein Z represents methyl, bromo, chloro, or hydroxy and $n$ represents an integer of 0 or 1; and R' represents naphthyl, 9-anthryl, 9-phenanthryl, styryl, 2-furyl, 2-thienyl, 1 - methyl - 2 - pyrrolyl or a phenyl radical of the formula:

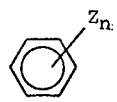

which method comprises reacting at a temperature of from 30° to 200° C., a first reactant of the formula:

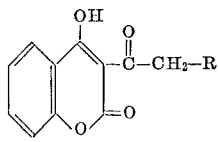

with a second reactant of the formula:

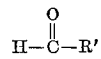

References Cited

Woods, J. Org. Chem. 27: 696–8 (1962).

JOHN D. RANDOLPH, Primary Examiner

C. M. SHURKO, Assistant Examiner

U.S. Cl. X.R.

260—240, 326.3, 332.2, 343.5; 424—274, 275, 279